(12) United States Patent
Lam

(10) Patent No.: US 6,968,468 B2
(45) Date of Patent: Nov. 22, 2005

(54) DIGITAL COMPUTER UTILIZING BUFFER TO STORE AND OUTPUT DATA TO PLAY REAL TIME APPLICATIONS ENABLING PROCESSOR TO ENTER DEEP SLEEP STATE WHILE BUFFER OUTPUTS DATA

(75) Inventor: James Lam, Fremont, CA (US)

(73) Assignee: O2 Micro, Inc., Santa Clara, CA (US)

( * ) Notice: Subject to any disclaimer, the term of this patent is extended or adjusted under 35 U.S.C. 154(b) by 608 days.

(21) Appl. No.: 10/082,782

(22) Filed: Feb. 25, 2002

(65) Prior Publication Data

US 2003/0163742 A1 Aug. 28, 2003

(51) Int. Cl.⁷ ............................................... G06F 1/32
(52) U.S. Cl. ..................................... 713/320; 713/324
(58) Field of Search ............................... 713/300, 320, 713/324

(56) References Cited

U.S. PATENT DOCUMENTS

| | | | | |
|---|---|---|---|---|
| 4,156,907 A | * | 5/1979 | Rawlings et al. | 709/212 |
| 5,295,246 A | | 3/1994 | Bischoff et al. | 395/250 |
| 5,790,817 A | | 8/1998 | Asghar et al. | 395/309 |
| 6,021,506 A | | 2/2000 | Cho et al. | 713/601 |
| 6,032,232 A | | 2/2000 | Lindeborg et al. | 711/149 |
| 6,138,516 A | * | 10/2000 | Tillman | 73/649 |
| 6,148,345 A | * | 11/2000 | Yamaki | 709/253 |
| 6,157,583 A | | 12/2000 | Starnes et al. | 365/200 |
| 6,205,521 B1 | | 3/2001 | Schumann | 711/144 |
| 6,266,776 B1 | | 7/2001 | Sakai | 713/300 |
| 6,288,932 B1 | | 9/2001 | Samala | 365/154 |
| 6,370,564 B2 | * | 4/2002 | Bretscher | 709/205 |
| 6,804,792 B2 | * | 10/2004 | Nishikawa | 713/323 |

FOREIGN PATENT DOCUMENTS

GB 2301202 11/1996 ............ G06F/1/32

OTHER PUBLICATIONS

Translation of the Text of the Notification of the 2nd Office ACtion; Application No. 031063373.

* cited by examiner

*Primary Examiner*—Rehana Perveen

(57) ABSTRACT

A computer capable of playing real time applications includes a processing circuit configured to operate in a first power state, a second power state, and a third power state where the processing circuit consumes less power in the second state than in the first state, and less power in the third state than in the second state; and a real time subsystem coupled to the processing circuit, wherein the real time subsystem includes a buffer. The buffer is further configured to store data and output the data to an output device thereby enabling the processing circuit to enter the third power state while the buffer is outputting said data.

19 Claims, 3 Drawing Sheets

DIGITAL COMPUTER UTILIZING BUFFER TO STORE AND OUTPUT DATA TO PLAY REAL TIME APPLICATIONS ENABLING PROCESSOR TO ENTER DEEP SLEEP STATE WHILE BUFFER OUTPUTS DATA

FIELD OF THE INVENTION

This invention relates to power conservation within a digital computer, and more particularly to digital computers capable of playing real time applications such as audio, video, and games.

BACKGROUND OF THE INVENTION

Efforts have been underway recently to reduce power consumption in computers. Computers including desktop PCs and portable computers are prevalent in most everyday office and home life. While most PCs consume a modest amount of power, in combination they consume a significant amount of power. In addition, portable computers are constantly striving to reduce power consumption, which enables it to have prolonged times between recharging of a battery supply, and/or to have a smaller size battery.

In conjunction with power conservation efforts, capabilities of computers are expanding to include real time entertainment applications, e.g., such as audio, video, and game applications, as well as the more traditional computing applications. For instance, CD/DVD-ROM drives are becoming more commonplace in many computers. In addition to traditional uses, such drives enable a user to play standard music CDs on their computer equipped with appropriate audio transducers, e.g., speakers. For audio applications, MP3 files and MP3 players may also be used to listen to audio data. The DVD-ROM drive and associated video subsystems may also permit a user to view a video on the computer display screen. In addition, various video games may also be played.

Such real time applications are typically not compatible with typical PC and portable computer processor power conservation efforts. As opposed to other applications, real time applications require the computer system to be able to respond to any request at any time. Therefore, the computer's operating system maintains the processor in, at most, a light sleep state. If the processor were put into a deep sleep state, the processor may not be fast enough to keep up with the output data from the real time application. In the case of an audio application for instance, the user would hear a click sound. In the case of a video application, the video screen would be frozen for a short period of time.

In addition, most processors have cache memory to enhance processing power. In order to keep data coherency between cache memory and system memory, the processor has to keep track of access from any other components in the system. Some components may have direct access to system memory. For example, an audio component in an audio subsystem may be able to retrieve audio data directly from system memory.

To support such direct access methods, each component has to know when it needs more data and where to retrieve it. With a processor having an internal cache memory, some of the data may be temporarily stored in cache memory rather than system memory. Because of this the processor cannot be put into a deep sleep mode when any of the system components use such direct access methods. Accordingly, power conservation efforts in these instances are thwarted.

Finally, components that are connected to the same bus must be in the same or lower power state as the bus itself. This protocol is supported by the Advanced Configuration and Power Interface (ACPI) Specification, which is a Specification jointly established by Intel Corporation, Microsoft Corporation, and Toshiba Corporation in order to facilitate controlling electrical power consumption in computers. However, this protocol presents power conversation limitations. One example utilizing this protocol is listed in PCI Bus Power Management Interface Specification Revision 1.1.

For instance, if the component is a real time application component, e.g., an audio or video component, that needs to be in a higher power state in order to perform certain operations, e.g., video or audio playback, the connected bus in such a computer system would have to be in a similar higher power state. In addition, some other components may also have to be in the same or higher power state in order to maintain the bus in the higher power state. This ends up increasing power consumption of the entire computer.

Accordingly, there is a need for an apparatus and method that overcomes the above deficiencies in the prior art to allow for improvements in power conservation techniques including an apparatus capable of allowing a processor and other system components to enter a deep sleep power state while playing real time applications without degradation in audio and video output performance.

BRIEF SUMMARY OF THE INVENTION

A computer capable of playing real time applications consistent with the present invention includes a processing circuit configured to operate in a first power state, a second power state, and a third power state, wherein the processing circuit consumes less power in the second power state than in the first power state, and the processing circuit consuming less power in the third power state than in the second power state; and a real time subsystem coupled to the processing circuit, where the real time subsystem includes a buffer configured to store data and output the data to an output device thereby enabling the processing circuit to enter the third power state while said buffer is outputting the data.

A real time subsystem consistent with the present invention includes a buffer configured to store data for use in the real time application subsystem enabling a processing circuit of a computer to enter a deep sleep state while the computer is running the real time application.

A method of conserving power in a computer consistent with the present invention, while playing a real time application, includes the steps of: reading a storage medium of data for use in the real time application; processing the data in a processing circuit configured to operate in a first power state, a second power state, and a third power state, wherein the processing circuit consumes less power in the second power state than in the first power state, and the processing circuit consumes less power in the third power state than in the second power state; storing the data in a buffer; outputting the data from the buffer to a real time application output device; and placing the processing circuit in the third power state while the buffer is outputting the stored data.

Another method of conserving power in a computer consistent with the present invention, where at least one device has direct access to system memory, includes: flushing cache memory of a processing circuit to system memory of the digital computer, wherein the processing circuit is configured to operate in a first power state, a second power state, and a third power state, wherein the processing circuit consumes less power in the second power state than in the first power state, and the processing circuit consuming less power in the third power state than in the second power state; placing the processing circuit in the third power state; and maintaining a first device power state in at least one device, wherein the device is configured to operate in a first device power state, a second device power state, and a third device power state, and wherein the device consumes less power in the second device power state than in the first device power state, and the device consumes less power in the third device power state than in the second device power state.

Another aspect of the invention is a computer for improving security of system memory access when at least one device has direct access to system memory including: a processing circuit configured to operate in a first power state, a second power state, and a third power state, the processing circuit consumes less power in the second power state than in the first power state, and the processing circuit consuming less power in the third power state than in the second power state; a bridge coupled to the system memory and said at least one device having programmable control registers, the programmable control registers programmed to limit access of at least one device to system memory when the processing circuit is in the third power state.

Another aspect of the invention is a computer including a system clock control circuit configured to provide a plurality of clock signals; and a plurality of devices configured to receive an associated one of the plurality of clock signals, wherein at least one of the devices has a full power device state, a light sleep power device state, and a deep sleep power device state, where at least one device consumes less power in the light sleep device state than in the full power device state, and wherein the device consumes less power in the deep sleep device state than in the light sleep device state; wherein the system clock control circuit independently controls each of the plurality of clock signals.

A method of independently controlling power consumption of a plurality of devices in a computer consistent with the invention includes: providing a plurality of independent clock signals to the associated plurality of devices, wherein each of the plurality of devices has a full power device state, a light sleep power device state, and a deep sleep power device state, and wherein each of the plurality of devices consumes less power in the light sleep device state than in the full power device state, and wherein each of the plurality of devices consumes less power in the deep sleep device state than in the light sleep device state; and providing an associated independent clock signal to at least one of the devices keeping that device in a full power state while a remainder of the plurality of devices may be in a full power device state, a light sleep device state, or a deep sleep device state.

Finally, a computer capable of playing real time applications consistent with the present invention includes a processing circuit; an output device coupled to the processing circuit via a bus; and a real time application subsystem coupled to the processing circuit via the bus, wherein the real time subsystem includes a buffer, and the buffer is configured to store data and output the data to the output device thereby enabling the processing circuit to enter a deep sleep state while the buffer is outputting the data.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
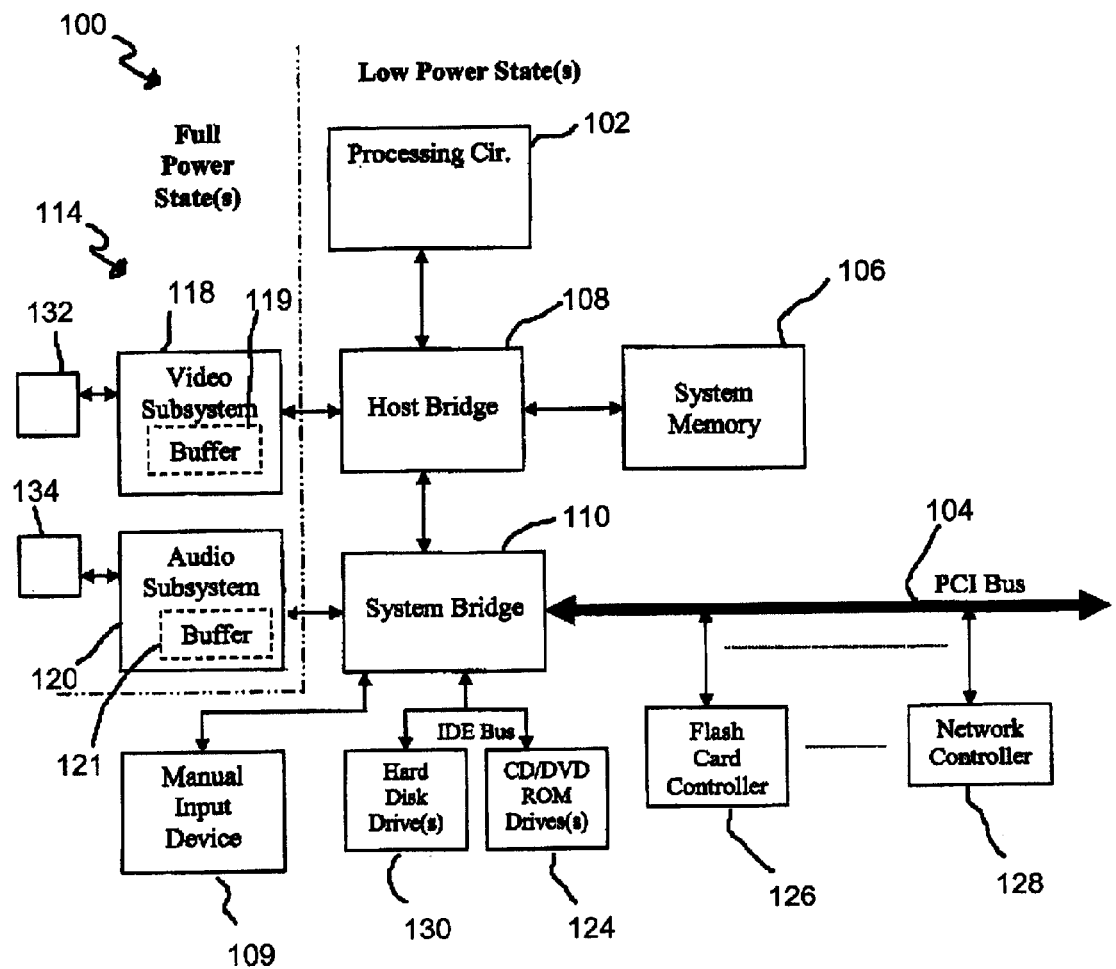
FIG. 1 is a block diagram of a computer including exemplary real time subsystems consistent with the present invention.

Turning to FIG. 1, a simplified block diagram of a computer 100 consistent with the present invention is illustrated. The computer 100 may be a desktop PC or a portable computer, e.g., a notebook, laptop, palmtop, personal digital assistant, and the like. The computer 100 may include a processing circuit 102, e.g., a CPU or processor. An exemplary processing circuit may be, for example, a Pentium processor available from Intel Corporation for executing instructions and controlling operation of the computer 100.

The processing circuit 102 may be coupled to system memory 106 in a conventional manner through the host bridge 108. In turn, the host bridge 108 may be further coupled to the system bridge 110 and PCI bus 104 in a conventional manner. Manual input devices 109 allow a user to input data to the computer 100. Such manual input devices may include a keyboard, mouse, joystick, touch-pad, control buttons for real time applications, or the like. The PCI bus 104 may be directly coupled to a variety of different controllers for controlling operation of associated peripheral devices. For example, a flash card controller 126, a network controller 128, and others may be directly coupled to the PCI bus 104.

The computer 100 may also include real time subsystems 114 such as a video subsystem 118 and an audio subsystem 120 which are coupled to the processing circuit 102. Advantageously, as described more fully later herein, the video subsystem 118 includes a buffer 119 and the audio subsystem 120 includes a buffer 121. A CD/DVD ROM drive 124 may be directly coupled to the system bridge 110 through an integrated drive electronics (IDE) bus in a conventional manner. The drive 124 is configured to read digital data from an external digital storage medium such as a conventional audio CD for audio applications or a conventional DVD for video applications.

The video subsystem 118 and the audio subsystem 120 contain a variety of circuits known to those skilled in the art for interfacing audio and video data with the processing circuit 102 through the system bridge 110 and host bridge 108 such that proper video and audio output can be played on a video output device 132 and audio output device 134 respectively. The video output device 132 may be a CRT, LCD matrix display or the like, while the audio output device 134 may be speakers, headphones, and the like. The audio and video data may be obtained from a number of sources including system memory 106, CDs, DVDs, or through electronic networking connections from other electronic storage sources.

The computer 100 receives power from a power source (not illustrated). For a desktop PC, the power source is typically conventional 120-volt AC power, which is converted to DC power by appropriate AC/DC converters. For portable computers, the power source may be a variety of standalone power sources such as a battery, solar cell, or the like. Any power efficiency gains for portable computers and desktop computers would provide operational benefits. For example, portable computers could have prolonged times between recharging of batteries and/or a smaller capacity battery.

Advantageously, a video subsystem 118 consistent with the invention includes a buffer 119 and the audio subsystem 120 consistent with the invention includes a buffer 121. The buffer 119, 121 may be a (First In First Out) FIFO buffer. The buffer 119, 121 may be configured to store pertinent data from real time applications, e.g., audio or video, when the processing circuit 102 is in a full power state. When one or both of the buffers 119, 121 reaches a predetermined full level data condition, the operating system may instruct the processor 102 to enter into a deep sleep state. On the other hand, if the stored data in one of the buffers 119, 121 reaches a predetermined low-level data condition while its associated subsystem 118, 120 is operating, the operating system may instruct the processor to wake up in order to refill the buffer with data.

Operation of a real time application subsystem 114 including the buffer is detailed herein with reference to an audio subsystem 120 and its associated buffer 121. This audio reference is done for clarity and should not be interpreted as limiting the scope of the present invention. Most audio applications do not need many resources of the processing circuit 102. For example, if the processing circuit 102 is a 677 MHz Pentium III processor available from Intel Corporation, only about 3% of the processor is required to perform real time decoding of an MP3 audio file.

When the audio subsystem 120 is operating such that and audio data, e.g., music, is played by audio transducers 134, the processing circuit 102 which is coupled to the audio subsystem 120 cooperates with the subsystem 120 to control such play. The processing circuit could be in a full power state. In this state, the processing circuit 102 consumes the most power relative to any other of several sleep states. There may also be a plurality of sleep states such as a light sleep state and a deep sleep state, where the processing circuit consumes less power in the deep sleep state than in the light sleep state. The light sleep state may be further divided into a first light sleep state and a second light sleep state, wherein the processing circuit consumes less power in the second light sleep state than in the first light sleep state.

In one example, the processing circuit's full power state may be state C0, the first light sleep state may be state C1, the second light sleep state may be state C2, and the deep sleep state may be state C3 as those states are defined by the Advanced Configuration and Power Interface (ACPI) Specification. For instance, the ACPI Specification, Revision 1.0b of Feb. 2, 1999, Copyright Intel Corporation, Microsoft Corporation, and Toshiba Corporation, establishes a set of five Global System States. One of the five Global System States includes a G0 or working state. In this G0 state, electrical power is turned on and user computer programs may be executed. Also in this G0 state, the processing circuit 102 has the four relative power states C0, C1, C2, and C3.

State C0 is a processor full power state where the processing circuit 102 or processor can execute instructions. States C1 and C2 are light sleep states and the state C3 is a deep sleep state. Those skilled in the art will recognize that the processor consumes sufficiently less power in each successive sleep state C1, C2, C3 compared to the preceding state. However, the power consumption difference between each state depends on system particulars, for example, particular processing circuit requirements, hardware, etc.

Generally, the hardware latency, e.g., how long it takes to return the computer to the working state, of the C1 state must be low enough that the operating software does not consider the latency aspect of this C1 state when deciding whether to use it. A processing circuit in state C2 offers improved power savings over state C1, and worst-case hardware latency for this state may be declared in a fixed ACPI Description Table. The operating software can use this information to determine when state C1 should be used instead of state C2.

Finally, a processor in state C3 offers improved power savings over states C1 and C2. Similar to state C2, the worst-case hardware latency for state C3 may be declared in a fixed ACPI Description Table. While in state C3 the processor's caches maintain state but ignore any snoops, and the operating software is responsible for ensuring that the caches maintain coherency. ACPI specifications provide additional detailed distinctions between states C0, C1, C2, and C3.

Again, an audio subsystem 120 consistent with the present invention advantageously includes a buffer 121, which may be a FIFO buffer. In such an instance, the buffer 121 may be configured to store audio data, e.g., decompressed MP3 data, when the processing circuit is in a full power state, e.g., state C0. When the buffer 121 reaches a predetermined full data condition, the buffer 121 generates a sleep signal to the processing circuit 102 instructing the processing circuit 102 to enter a relatively deep sleep state, e.g., state C3. On the other hand, if the audio data in the buffer 121 reaches a predetermined low-level data condition, the buffer may instruct the processing circuit 102 to wake up and enter into a full power state, e.g., state C0 such that data may again be stored in the buffer 121.

Those skilled in the art will appreciate that the buffers 119, 121 in the video subsystem 118 and the audio subsystem 120 have internal registers that may be programmed such that they generate an interrupt wake up signal to the processing circuit 102 when the buffer 119, 121 reaches a predetermined low-level data condition. The internal registers may also be programmed to generate an interrupt sleep signal to the processing circuit 102 when the buffer 119, 121 reaches a predetermined full data condition.

For example, playing an audio CD with the prior art method, the processing circuit was in a full power mode, e.g., state C0 state 3.0% of the time and in the light sleep state, e.g., state C1, 97.0% of the time. If the operating system put the processing circuit into a deep sleep state, e.g., state C3, it would take too long for the processing circuit to go back to the full power state to process any real time data. The processing circuit then may not be fast enough to keep up with the audio output data resulting in a poor quality sounding audio having a clicking sound.

In contrast, utilizing the audio subsystem 120 with the buffer 121 and a method consistent with the present invention while playing a MP3 file, the processing circuit was in a full power, e.g., state C0 state 3.0% of the time, in a second light sleep state, e.g., state C2 only 27% of the time, and in a deep sleep state, e.g., state C3, 70% of the time. Accordingly, significant power savings maybe realized utilizing a buffer 121 and method consistent with the present invention of storing data in the buffer to allowing the processing circuit 102 to enter into low power state, e.g., state C3.

In addition, as the processing circuit enters into such low power states, other devices also enter into similar low power states in accordance with typical ACPI protocol contributing to potentially additional power savings. Accordingly, the only components that need to be in a full power state are the respective real time subsystems 118 or 120 in use at a particular time as illustrated in FIG. 1. For example, when playing an audio file, the only component requiring a full power state is the audio subsystem 120 when its associated buffer 121 holds enough data to reach a predetermined full data condition. All other components may be in their respective low power states.

Figure 2:
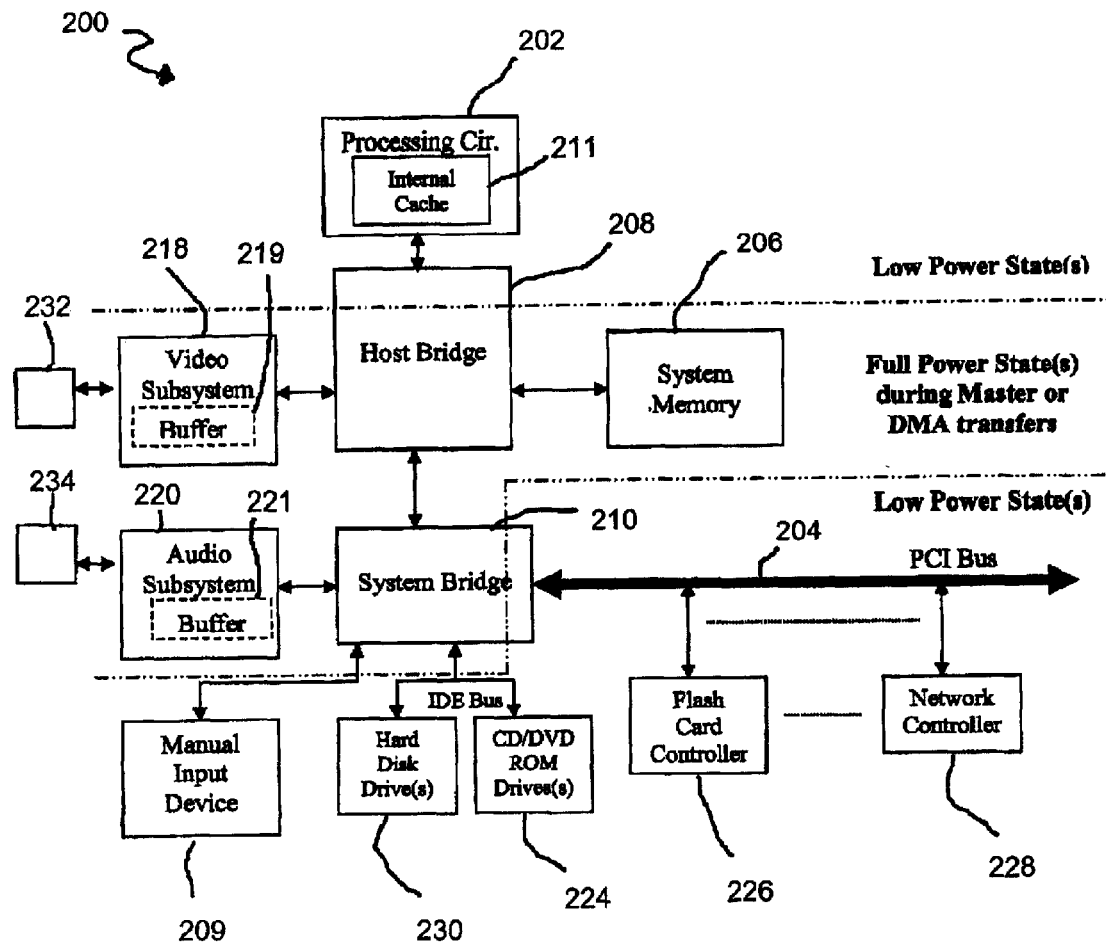
FIG. 2 is a block diagram of a computer according to another embodiment of the present invention including a processor with cache memory.

Turning to FIG. 2, a simplified block diagram of another computer system 200 consistent with the present invention is illustrated. Like parts of FIG. 2 are labeled similar to FIG. 1 and any explanation of parts explained with reference to FIG. 1 are omitted for clarity. As illustrated, most processing circuits 202 have internal cache memory 211 to enhance processing power. Cache memory 211 generally enables the processing circuit 202 to have faster access to blocks of data than it could take directly from system memory 206. Hence, cache memory 211 is typically loaded with data or instructions that are logically related to the most recently accessed data or instructions because it is the most likely data to be requested next.

To keep data coherency between cache memory 211 and system memory 206, the processing circuit 202 has to keep track of access from any other components in the computer system. For example, the real time subsystem may be an audio subsystem 220 that could retrieve data directly from system memory 206 via the system bridge 210 and host bridge 208. Those skilled in the art will recognize various methods to achieve direct access to system memory 206, the most common of which are Direct Memory Access (DMA) and Master Mode Access. To support these methods, each component, e.g., audio subsystem 220 or video subsystem 218, has to know when it needs more data and where to retrieve it. With a processing circuit 202 having an internal cache memory 211 some of the data may be temporarily stored in cache memory 211 rather than system memory 206. Because of this the processing circuit 202 cannot be put into a deep sleep mode, e.g, state C3, when any of the system components use DMA or Master Mode Access.

If there is data in the cache memory 211 of the processing circuit 202, a processing circuit 202 with core logic can hold or stop the DMA or master cycle while the data is then moved from the cache memory 211 to system memory 206 before the DMA or Master cycle retrieves the data. This architecture limits the processing circuit to either the C0, C1, or C2 power state such that a deep sleep processor state such as state C3 cannot be achieved.

In most real time applications, e.g., audio and video applications, most of the data is discarded once it is sent to an output device 232 or 234. Hence, immediately flushing any real time application data from cache memory 211 to system memory 206 enables the processor 202 to be put into a deep sleep state, e.g., state C3, while running any applications that utilize direct memory access methods. Because the processing circuit 202 flushes the real time data, it is not required to be involved on any memory access issues. Advantageously then, the processing circuit 202 may be put into a deep sleep state, e.g., state C3, and power conservation is improved.

In addition, those components that are involved in Master or DMA transfers may advantageously remain in full power states. As illustrated in FIG. 2, these components may include the video subsystem 218, the audio subsystem 220, the system bridge 210, the host bridge 208, and system memory 206 in order such subsystems to have direct access to system memory 206. This is different than the typical recommended protocol by the ACPI specification which places each component of the computer 200 in a low power state when the processing circuit 202 is in a low power state.

Component or device power states are also defined by the ACPI specification as device states D0, D1, D2, and D3. Such device states apply to any device on any bus. Generally, state D0 is a full power device state. State D1 and D2 are light sleep device states where a device in state D2 consumes less power than that same device in state D1. State D3 is a deep sleep state in which generally power is fully removed from that device.

Those skilled in the art will recognize that each device consumes sufficiently less power in each successive power state D1, D2, and D3 compared to the preceding state. However, the power consumption difference depends heavily on the particular class of device. For example, Microsoft Corporation publishes "Device Class Power Management Reference Specifications" for various classes of devices such as the audio device class, communications device class, display device class, and input device class to name a few that describes power states D0, D1, D2, and D3 for these various classes.

Because the processing circuit 202 may be in a low power state and is therefore not involved on any memory access issues, access to system memory 206 by various components in direct memory access applications may raise security concerns. One way to address such security concerns is to utilize core logic hardware to limit such direct memory access applications to predetermined areas of system memory 206 when the processor 202 is in a low power state. Limited access to system memory 206 may be accomplished by having the processor 202 program control registers in the host bridge 208 and the system bridge 210. In one embodiment, the programmed control registers cannot be accessed by a device, e.g., the video subsystem 218 or the audio subsystem 220, having direct access to system memory 206 via DMA or Master Access in order to prevent any unauthorized access and therefore provide improved security. Advantageously, the real time application subsystems 218 and 220 may then still have direct access to predetermined areas of system memory 206 while the processor is in a deep sleep state and such real time applications are running.

Figure 3:
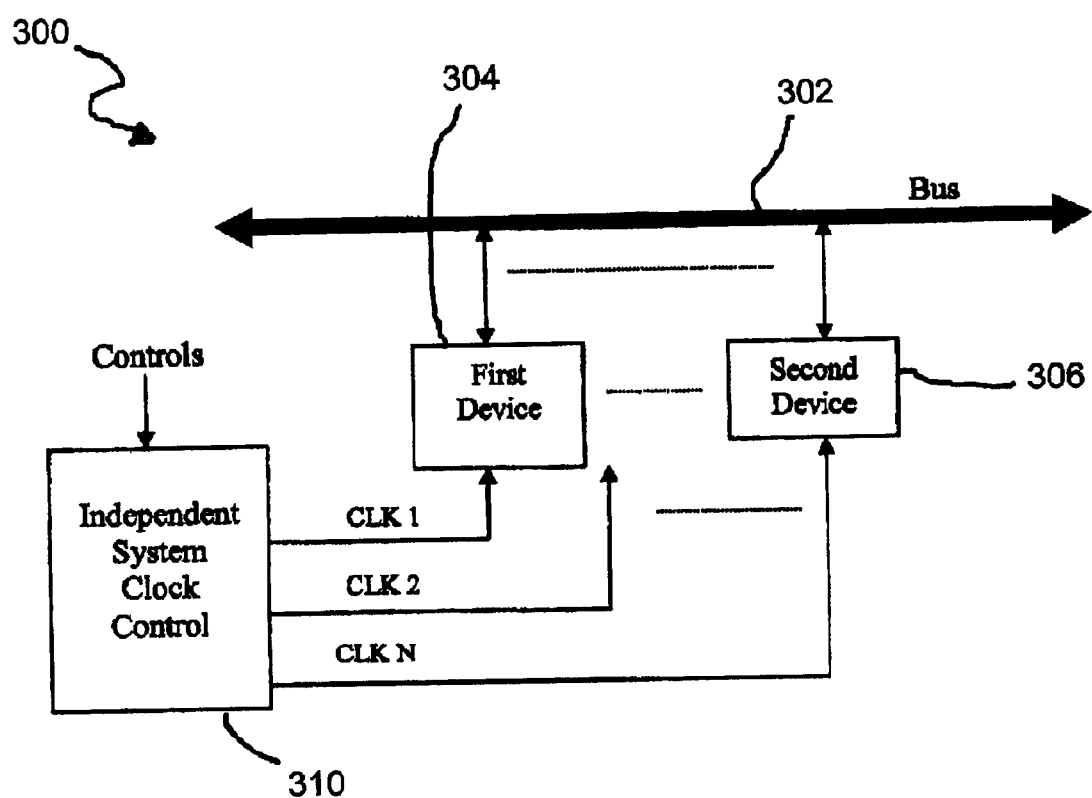
FIG. 3 is block diagram of a computer having an independent system controller for controlling independent clock signals for various components according to another embodiment of the present invention.

Turning to FIG. 3, a block diagram illustrating several devices of a computer system 300 consistent with the present invention is illustrated. The computer system 300 includes a bus 302 that may be coupled to a variety of devices or components. A first device 304 and second device 306 are illustrated, although any number of devices may be present. In one exemplary embodiment, the bus 302 may be a PCI bus and the first device 304 may be a flash card controller and the second device 306 may be a network controller as earlier illustrated in FIG. 1.

As indicated in the ACPI Specification, all devices or components connected to the same bus must be in the same or lower power state as the bus itself. In this way, any device can access any resource through the same protocol or rules. However, this presents power conservation problems for some devices. For instance, an audio subsystem may be coupled to the bus 302 and may need to be in a higher power state, e.g., state D0, in order to perform certain operations, e.g., audio playback. In this situation, the bus 302 would have to be in a similar higher power state. In addition, some other unrelated components may also have in the same or higher power state in order to maintain the bus 302 in the higher power state. This ends up increasing power consumption of the entire computer system 300.

Accordingly, an apparatus and method consistent with the present invention independently controls each device and bus to place each in an appropriate power state in order to decrease power consumption. In order to accomplish this, a system clock control circuit 310 independently controls each device with associated clock signals CLK 1, CLK 2, CLK N. Advantageously, even if the bus 302 is in a low power state and the bus clock is stopped, a device 304 or 306 may be independently controlled by an associated clock signal CLK 1 and CLK 2 so that it may operate in a higher power state. For example, an audio component may be in a higher power state to allow audio playback while the connected bus and other unrelated components might be in a deep sleep mode. Therefore, device and bus clocks can be controlled independently for each device instead of being connected as suggested by the ACPI Specification. An exemplary system clock control circuit that may be configured to operate in a computer system consistent with the invention is Part No. ICS95021 or ICS950806 available from Integrated Circuit Systems, Incorporated.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A computer capable of playing real time applications comprising:
   a processing circuit configured to operate in a first power state, a second power state, and a third power state, said processing circuit consuming less power in said second power state than in said first power state, and said processing circuit consuming less power in said third power state than in said second power state; and
   a real time subsystem coupled to said processing circuit, said real time subsystem comprising a buffer, said buffer configured to store data and output said data to an output device for playing said real time applications thereby enabling said processing circuit to enter said third power state while said buffer is outputting said data.

2. The computer of claim 1, wherein said first power state is a full power state, said second power state is a light sleep state, and said third power state is a deep sleep state, said light sleep state further comprising a first light sleep state and a second light sleep state, wherein said processing circuit consumes less power in said second light sleep state than in said first light sleep state, and wherein said buffer stores said data while said processing circuit is in said full power state or said first light sleep state.

3. The computer of claim 2, wherein said full power state is state C0, said first light sleep state is state C1, said second light sleep state is state C2, and said deep sleep state is state C3.

4. The computer of claim 1, wherein said real time application subsystem is a video subsystem or an audio subsystem.

5. The computer of claim 1, wherein said buffer is a FIFO buffer.

6. A real time subsystem comprising:
   a buffer configured to store data for use in said real time subsystem enabling a processing circuit of a computer to enter a deep sleep state while said computer is running said real time subsystem.

7. The real time subsystem of claim 6, wherein said real time subsystem is a video subsystem or audio subsystem.

8. A method of conserving power in a computer while playing a real time application comprising the steps of:
   reading a storage medium of data for use in said real time application;
   processing said data in a processing circuit configured to operate in a first power state, a second power state, and a third power state, said processing circuit consuming less power in said second power state than in said first power state, and said processing circuit consuming less power in said third power state than in said second power state;
   storing said data in a buffer;
   outputting said data from said buffer to a real time application output device; and
   placing said processing circuit in said third power state while said buffer is outputting said stored data.

9. The method of claim 8, wherein said first power state is a full power state, said second power state is a light sleep state, and said third power state is a deep sleep state, said light sleep state further comprising a first light sleep state and a second deep light state, wherein said processing circuit consumes less power in said second light sleep state than in said first light sleep state, and wherein said storing occurs when said processing circuit is in said full power state.

10. The method of claim 9, wherein said full power state is state C0, said first light sleep state is state C1, said second light sleep state is state C2, and said deep sleep state is state C3.

11. The method of claim 8, wherein said storing step is completed when said buffer reaches a predetermined full level data condition, and said processing circuit is woken up from said third power state when said buffer reaches a predetermined low level data condition.

12. The method of claim 11, wherein said first power state is a full power state, said second power state is a light sleep state, and said third power state is a deep sleep state, said light sleep state further comprising a first deep light state and a second light sleep state, wherein said processing circuit consumes less power in said second light sleep state than in said first light sleep state, and when said processing circuit is said woken up, said processing circuit enters into said full power state.

13. The method of claim 12, wherein said full power state is state C0, said first light sleep state is state C1, said second light sleep state is state C2, and said deep sleep state is state C3.

14. A method of conserving power in a computer where at least one device has direct access to system memory comprising the steps of:
   flushing cache memory of a processing circuit to said system memory of said computer, wherein said processing circuit is configured to operate in a first power state, a second power state, and a third power state, said processing circuit consuming less power in said second power state than in said first power state, and said processing circuit consuming less power in said third power state than in said second power state;
   placing said processing circuit in said third power state; and
   maintaining a first device power state in said at least one device, wherein said at least one device is configured to operate in said first device power state, a second device power state, and a third device power state, said device consuming less power in said second device power state than in said first device power state, and said device consuming less power in said third device power state than in said second device power state.

15. The method of claim 14, wherein said first power state is a full power state, said second power state is a light sleep state, and said third power state is a deep sleep state, said light sleep state further comprising a first light sleep state and a second light sleep state, wherein said processing circuit consumes less power in said second light sleep state than in said first light sleep state.

16. The method of claim 15, wherein said full power state is state C0, said first light sleep state is state C1, said second light sleep state is state C2, and said deep sleep state is state C3.

17. The method of claim 14, wherein said first device power state is a full device power state, said second device power state is a light sleep device state, and said third device power state is a deep sleep device state, said light sleep device state further comprising a first device light sleep state and a second device light sleep state, wherein said device consumes less power in said second device light sleep state than in said first device light sleep state.

18. The method of claim 17, wherein said full device power state is state D0, said first device light sleep state is state D1, said second device light sleep state is state D2, and said deep sleep device state is state D3.

19. A computer capable of playing real time applications comprising:

a processing circuit;

an output device coupled to said processing circuit via a bus; and a real time subsystem coupled to said processing circuit via said bus, said real time subsystem comprising a buffer, said buffer configured to store data and output said data to said output device for playing said real time applications thereby enabling said processing circuit to enter a deep sleep state while said buffer is outputting said data.

* * * * *